DEFLECTION YOKE AND APPARATUS FOR ITS FABRICATION UTILIZING A MAGNETIC RAMMING TECHNIQUE

Filed Feb. 12, 1969

INVENTORS
Josef Gross and
William H. Barkow
BY Eugene M. Whitacre
ATTORNEY

INVENTORS
Josef Gross and
William H. Barkow
BY Eugene M. Whitacre
ATTORNEY

INVENTORS
Josef Gross and
William H. Barkow
BY Eugene M. Whitacre
ATTORNEY

INVENTORS
Josef Gross and
William H. Barkow
BY Eugene M. Whitacre
ATTORNEY

United States Patent Office 3,518,590
Patented June 30, 1970

1 2

3,518,590

DEFLECTION YOKE AND APPARATUS FOR ITS FABRICATION UTILIZING A MAGNETIC RAMMING TECHNIQUE

Josef Gross, Princeton, and William Henry Barkow, Pennsauken, N.J., assignors to RCA Corporation, a corporation of Delaware Filed Feb. 12, 1969, Ser. No. 798,601
Int. Cl. H01f *5/00*
U.S. Cl. 335—213 12 Claims

ABSTRACT OF THE DISCLOSURE

Each coil of at least one pair of coils to be diametrically disposed about the cylindrical neck and flared bulb sections of a cathode ray tube have the longitudinal active conductors located on opposite sides of a window opening with those conductors adjacent the window opening having substantially the same configurations as the sides of the window opening. All of the longitudinal conductors are disposed such that they closely fill the coil arbor cavity. The apparatus by which such a coil is fabricated includes a pair of male and female members mated together to form a cavity with a window block extending between the members to divide the cavity into two equal compartments and into which a plurality of convolutions of wire are wound to be formed into the desired coil configuration. The male and female members are magnetized to produce a magnetic field in both cavity compartments which is normal to the cavity forming surfaces of the male and female members. The window block is preferably of non-magnetically permeable material so that, when the coil is pulsed with current, an electromagnetic ramming force is produced on all of its conductors constraining all of the longitudinal side conductors to move toward the window block, thus completely filling both cavity compartments with the convolutions of the coil. The pulsing current heats the wire to soften its thermoplastic insulating coating and the remaining force merges adjacent convolutions so that they become bonded together after cessation of the pulsing current and cooling of the coil.

Background of the invention

An electromagnetic beam deflection yoke for use with a cathode ray tube, such as a color television picture tube of the shadow mask variety for example, comprises a pair of horizontal and a pair of vertical saddle type coils. Each coil has two spaced groups of active side conductors extending generally along the longitudinal axis of the tube and spaced from one another circumferentially of the tube for deflecting the electron beam or beams of the tube. The side conductors are joined together at their ends by end conductors which extend transversely of the tube and which, thus, are ineffective to produce beam deflection. The active side conductors follow the contour of the tube which, in the case of the picture tube, flares from a cylindrical neck section housing an electron gun or guns into a bulb section housing a luminescent screen. The opening defined by the two spaced groups of active side conductors and their associated front and rear end turns is generally termed a "window."

Wide angle beam deflection yokes of the character described not only must deflect the electron beam or beams through the required angles to completely scan the screen, but also must do so with a minimum, if any, of raster distortion, astigmatism and coma. Also, particularly in a three-beam shadow mask type of color picture tube, the horizontal and vertical beam deflection centers should be coincident. The capability of a yoke to accomplish such ends is determined by the location of the active side conductors in their respective groups. The yokes produced with presently used apparatus and techniques represent, at best, a compromise of these desirable characteristics.

The optimum deflection yoke, particularly one for use with a three beam shadow mask type of picture tube, should have all of these seemingly incompatible characteristics; i.e., it should produce uniform misconvergence (minimum horizontal and vertical astigmatism, no trap nor coma) of the three beams and at the same time have coincident horizontal and vertical deflection centers and a minimum, if any, of pincushion distortion of the raster scanned at the luminescent screen of the tube.

A yoke generating a deflection field with a minimum transverse nonuniformity would be the closest realizable approximation of such an optimum yoke. Such a yoke would have an $H_2$ characteristic of minimum range of variation. This $H_2$ characteristic is usually depicted by a so called "$H_2$" curve which has negative lobes representing the field nonuniformity at the front and rear fringes of the field produced by the yoke and a positive main lobe representing the field nonuniformity in the central deflection region of the yoke. The coils of such a minimum $H_2$ yoke require a distribution of the coil convolutions having a concentration of active conductors remote from the window in the front and longitudinal rear cross sections of the coils (to raise the negative fringe lobes of the $H_2$ curve), and a concentration of active conductors near the window opening in the central cross sections of the coils (to lower the positive main lobe of the $H_2$ curve). The typical active conductors of such a coil would follow a path which is concave toward the window opening and is longer than a geodesic line between its two end points on the inner surface of the yoke which corresponds to the flared curvature of the cathode ray tube.

Saddle type coils for electron beam deflection yokes customarily are wound by machines embodying the teachings of U.S. Pat. No. 2,448,672 granted to H. V. Knauf, Jr., Sept. 7, 1948. A more sophisticated version of the Knauf apparatus for winding coils of a flared yoke for use with a present day picture tube having a cylindrical neck section merging into a flared bulb section is disclosed in U.S. Pat. No. 3,392,760 granted to H. E. Haslau, July 16, 1968. The Haslau apparatus is designed to wind a deflection yoke coil in which a maximum number of the active side conductors follow geodesic lines on the curved flared bulb section of the cathode ray tube. The term "geodesic line," as used in this and following portions of the description and in the claims, is intended to have its usually accepted meaning, viz., the shortest path on a given surface connecting two given points on that surface. Even in the Haslau apparatus which has a geodesic window block about which the wire convolutions are wound it is not possible, using known mass production techniques, to produce a coil in which the desired conductors follow paths which are longer than geodesic paths and, at the same time, are concave inwardly toward the window opening. Instead, such conductors, if they follow paths longer than geodesic lines, will lie along lines which are convex relative to the window opening.

As taught in the Haslau patent and in accordance with heretofore used techniques, the coil winding apparatus produces a coil having only approximately the desired shape. The final shaping is accomplished by mechanically pressing or "ramming" two blades into the arbor cavity against those convolutions of the coil which are the most remote from the window block. Such mechanical ramming has a number of practical disadvantages, one of which is that only those convolutions of the coil which are farthest from the window block are directly affected and moved inwardly toward the window block. Thus, the active conductors adjacent the window block can have only curvatures which, at best, are geodesic. Consequently, it is practically not possible with present coil winding apparatus and mechanical ramming techniques to produce a yoke coil in which substantially all of the active conductors follow curved paths that are concave toward the window opening and are longer than geodesic lines. Also, because of the inherent inability of the mechanical ramming technique to have any significant effect upon those coil convolutions adjacent to the window block and because of the relatively high speeds at which the coils are wound under fluctuating wire tension by apparatus such as that represented by the Haslau patent, the active conductors do not fill the winding arbor cavity uniformly, particularly in the region of the window block. Consequently, there is a deficiency of active conductors adjacent to the window opening of the coil. Another disadvantage of mechanical ramming is the possibility of abrading or otherwise impairing the wire insulation, thereby necessitating the rejection of such coils.

It, therefore, is an object of this invention to provide an improved deflection yoke and the apparatus for fabricating it.

In accordance with the invention the improved saddle type coil embodied in a yoke for deflecting an electron beam of a cathode ray tube, which may have a cylindrical neck section merging into a flared bulb section, comprises a plurality of convolutions of wire, the longitudinal active conductor portions of those convolutions (immediately adjacent a central window opening) having substantially the same configurations as the longitudinal sides of the window opening determined by the window block of a coil winding arbor.

The apparatus provided in accordance with the invention for forming the improved saddle type coil for an electron beam deflection yoke comprises a pair of cavity forming male and female members having a window block of nonmagnetically permeable material extending between them and dividing the cavity into two compartments which are equal and symmetrical relative to the window block and in which to receive the longitudinal active side conductors of the coil. The male and female members may be oppositely poled permanent magnets or may be of magnetically permeable magnetizable material so as to produce a magnetic field in both compartments of the cavity when the cavity forming members are placed between the two poles of an external magnet and which field is substantially normal to the opposing surfaces of the cavity forming members. When the desired number of coil convolutions have been wound into the cavity, the winding apparatus is stopped and the coil is pulsed with current which produces an electromagnetic ramming force on all of the longitudinal active side conductors in the magnetic field between the two cavity forming members. The electromagnetic ramming force is exerted substantially tangentially to the opposing surfaces of the cavity forming members and the direction of the current flow in the side conductors in relation to the polarity of the magnetic field is such that all of the side conductors are constrained to move inwardly toward the window block to conform to the cavity determined by the window block and the male and female portions of the coil winding arbor.

For a more complete disclosure of apparatus embodying the invention, reference may be had to the following detailed description of an illustrative embodiment which is given in conjunction with the accompanying drawings, of which:

Figures 11, 12:
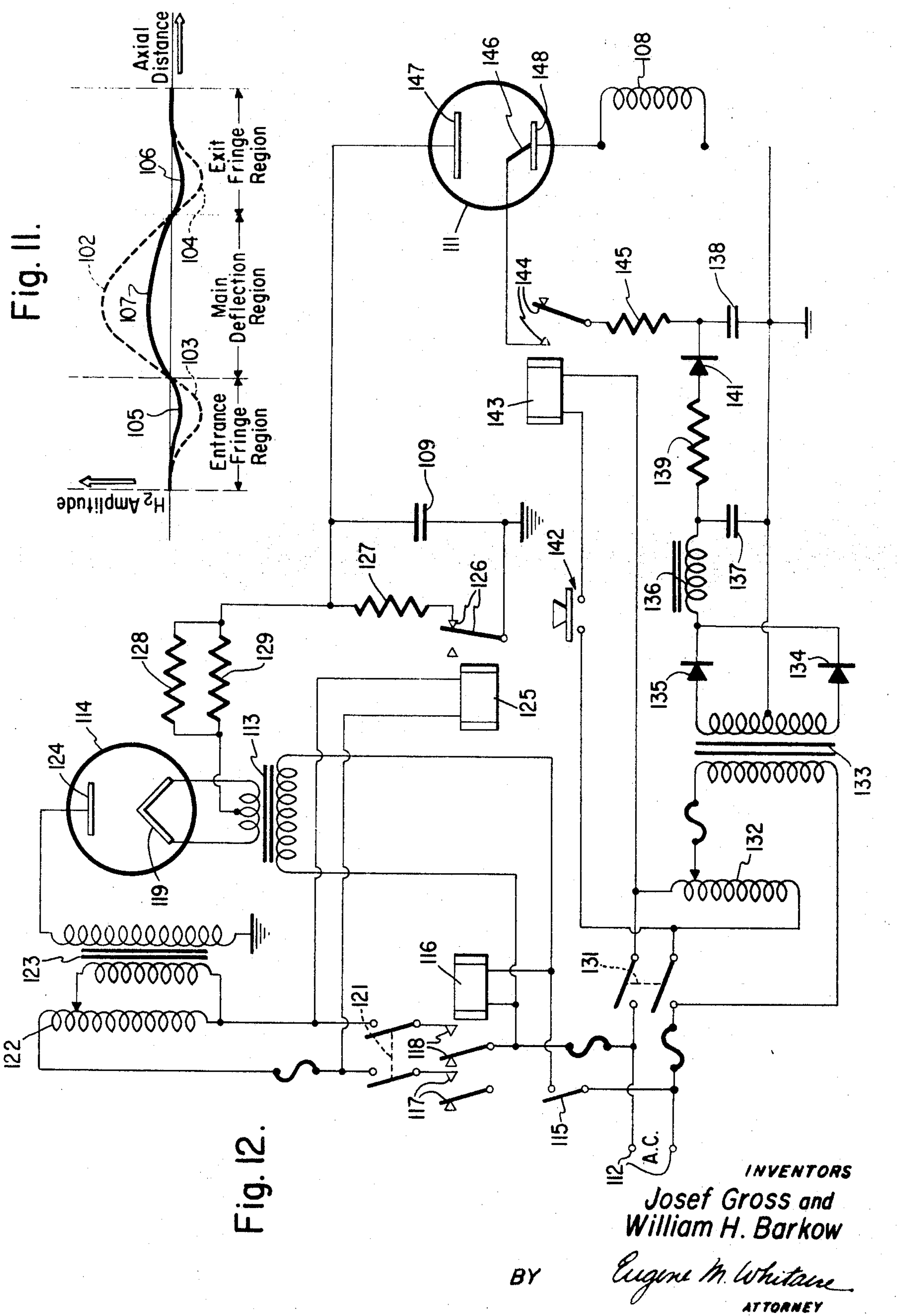

FIG. 11 is a graph comprising curves illustrating the improvements of the transverse field nonuniformity of deflection yokes having magnetically rammed coils in accordance with the invention as compared to yokes having mechanically rammed coils; and FIG. 12 is a circuit diagram of one type of apparatus which may be used to effect the current pulsing of the coil by which to produce the magnetic ramming of the coil conductors toward the window block of the coil winding apparatus.

Figure 1:
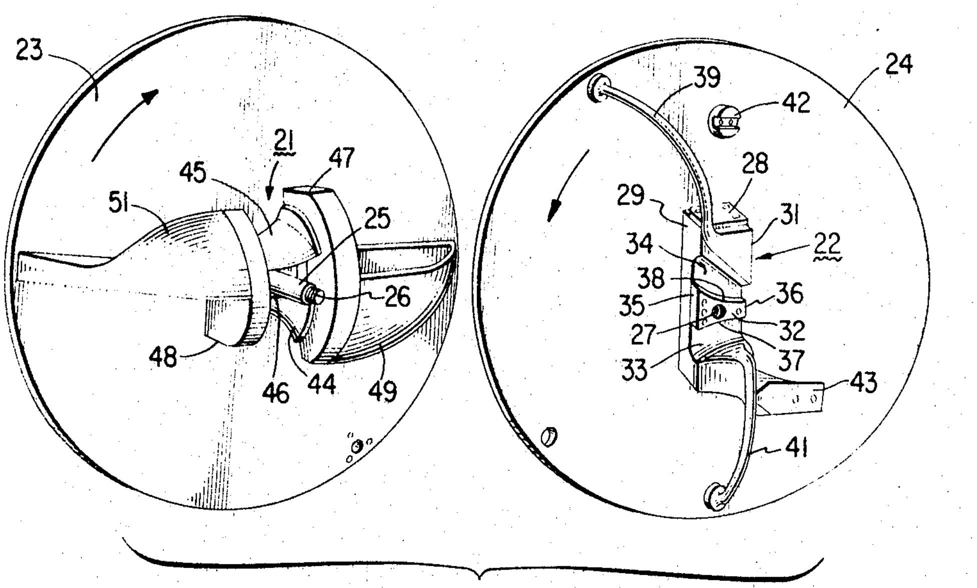
FIG. 1 is an opened view of the male and female arbor members which, when mated, form the cavity into which the coil is wound.

In FIG. 1, the opened view of the opposing surfaces of the male and female members 21 and 22 respectively of a cavity forming coil winding arbor of the type disclosed in the Haslau patent shows the salient details of one apparatus which may be used in the practice of the invention. The male and female members 21 and 22 are supported respectively by mounting plates 23 and 24. A spindle 25 having a threaded end portion 26 is rigidly attached to the mounting plate 23 and extends inwardly through the male member 21 for insertion into a centrally located hole 27 in the female member 22. The threaded end 26 of the spindle is adapted to be engaged by a captive nut (not shown) in the female member 22 to join the male and female members 21 and 22 suitably to form the coil winding cavity. The spindle 25 extends outwardly from the male member mounting plate 23 and is adapted to be rotated by suitable means (not shown) so as to impart a rotating motion to the mated male and female members 21 and 22 as indicated by the arrows.

The female cavity forming member 22 comprises a block 28 having a flat front end surface 29 and a similar flat rear end surface 31. This member also is provided with a centrally located window block 32 on either side of which is a pair of spaced recesses 33 and 34. Each of the recesses is concavely curved toward the mounting plate 24 so as to conform substantially with the configuration of the merging neck and flared bulb sections of a cathode ray picture tube with which the deflection yoke is to be used. The window block 32 has front and rear ends 35 and 36, respectively, which are coplanar with the associated front and rear surfaces 29 and 31 of the block 28. The window block 32 also has curved sides 37 and 38, the curvature being such that the intersections of the window block side sections 37 and 38 with the respective recesses 33 and 34 define lines which are concave longer than geodesic toward the center of the window block along the curved contours of the recesses. It is to be understood that the described curvature of the window block is merely illustrative and that other curvatures, such as geodesic and convex longer than geodesic, may be used in the practice of the invention. In accordance with this invention, the female member block 28 may be of permanent magnet material or of a magnetically permeable material such as cold rolled steel, for example. The window block 32, however, and the spindle 25 of the male member 21 are preferably of nonmagnetically permeable material such as brass or aluminum, for example. End plates 23 and 24 preferably are also of nonmagnetically permeable material so that the desired magnetic field may be applied efficiently across the arbor halves in a manner to be described subsequently.

The female cavity forming member 22 also is provided with a pair of side wire deflecting rods 39 and 41, one end of each of these rods being attached to the main block 28 on opposite sides thereof, and the other end of each of the rods being attached to the mounting plate 24 at spaced points adjacent the periphery thereof. The purpose of such rods is to deflect, or guide, the wire into the recesses 33 and 34 during the coil winding operation in a manner described in more detail in the Haslau patent. The female member 22 also is provided with a wire starting terminal 42 and a wire finishing terminal 43. One end of the wire is anchored to the starting terminal 42 at the beginning of a winding operation and the other end of the wire comprising the wound coil is attached to the finishing terminal 43 at the termination of a winding operation. Both of the terminals 42 and 43 are electrically insulated from the mounting plate 24.

The male cavity forming member 21 includes a pair of spaced body sections 44 and 45, both of which have curved configurations convex from mounting plate 23 conforming substantially to the configuration of the merging neck and flared bulb sections of a cathode ray picture tube with which the deflection coil is to be used. The body sections 44 and 45 are separated by a window aperture 46 which has a configuration matching that of the window block 32 of the female cavity forming member 22. The dimensions of the window aperture 46 are only slightly greater than the outside dimensions of the window block 32 so that the window block may be snugly fitted into the aperture 46 when the male and female members 21 and 22 of the winding arbor are joined.

The male cavity forming member 21 also has front and rear flanges 47 and 48, respectively, which extend radially outward from the ends of the body sections 44 and 45 substantially parallel to one another. The internal spacing between the front and rear flanges 47 and 48 is sufficiently greater than the spacing between the front and rear surfaces 29 and 31 of the female cavity forming member 22 to constitute end pockets of the cavity formed by the mated male and female members 21 and 22 in which to receive the transverse, or end, conductors of the coil. The front flange 47 is larger than the rear flange 48 in order to conform with the larger flared front end of the coil. In accordance with this invention the male member body sections 44 and 45 may be of permanent magnet material or of highly permeable soft magnetic material such as cold rolled steel, for example.

The male cavity forming member 21 also is provided with a pair of end wire deflecting vanes 49 and 51. Each of these vanes is a hollow shell, one end of the outer surface of each of which has a configuration conforming to that one of the flanges 47 and 48 with which it is associated. Each vane has an outer curved configuration extending substantially to the periphery of the mounting plate 23 so as to properly guide the wire into the winding cavity of the arbor during rotation of the apparatus. It is to be noted that the vanes 49 and 51 extend radially outwardly, approximately at right angles to the side deflecting rods 39 and 41 of the female cavity forming member 22.

Figure 2:
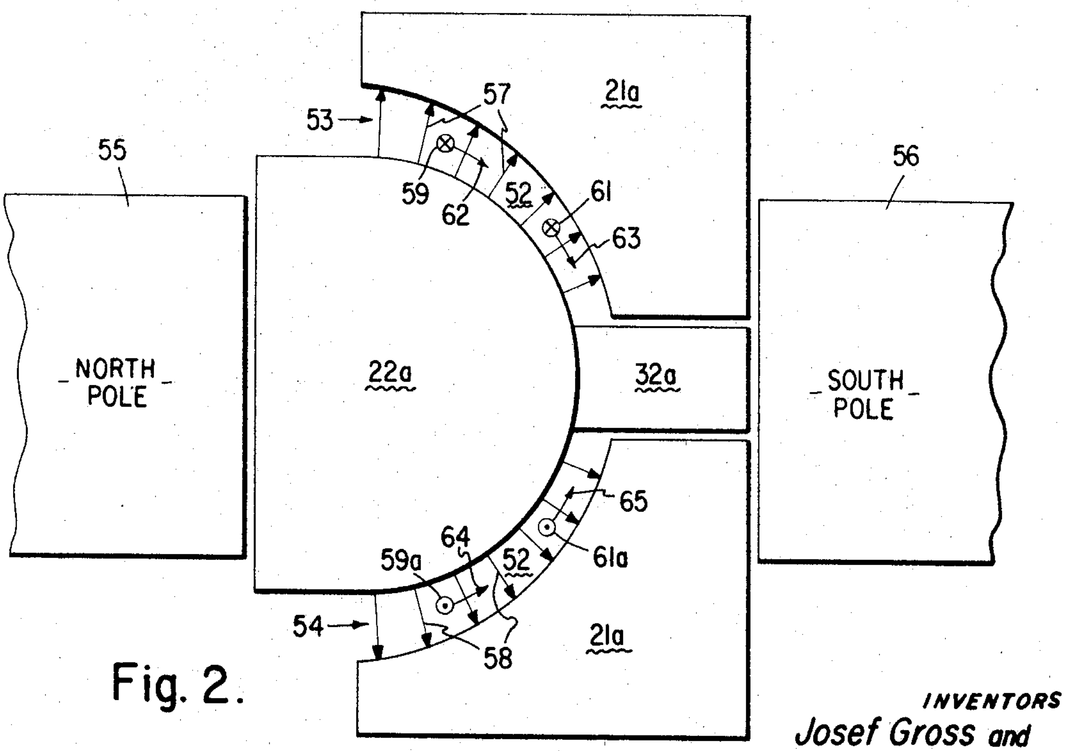
FIG. 2 is a diagrammatic cross sectional view of the mated male and female cavity forming members showing the electromagnetic ramming action on typical active side conductors of a coil wound in the cavity.

The diagrammatic FIG. 2 shows the relationship of the mated male and female members **21*a* and 22*a* between which the coil winding cavity 52 is formed. The cavity is divided by the window block 32*a* into two substantially equal compartments 53 and 54 symmetrically located relative to the window block. Whether the male and female members 21*a* and 22*a* are oppositely poled permanent magnets or are placed between the north pole 55 and the south pole 56 of an electromagnet, there is produced across both compartments 53 and 54 of the cavity 52 a magnetic field of which the flux lines extend in the direction of the arrows 57 and 58. After the desired number of convolutions of wire have been wound into the cavity 52 and the two ends of the coil have been attached to the starting and finishing terminals 42 and 43 as described with reference to FIG. 1, current is pulsed through the coil by apparatus to be described presently. Conductors 50–59*a* and 61–61*a* are representative side conductors of two convolutions of the coil and the pulsating current is assumed to be flowing into the plane of the drawing in conductors 59*a* and 61*a*. The arrows 62 and 63 represent the tangential magnetic ramming forces exerted upon conductors 59 and 61; and the arrows 64 and 65 represent the tangential magnetic ramming forces exerted upon conductors 59*a* and 61*a*. It is to be noted that the magnetic ramming forces exerted on all the side conductors of the coil constrain these conductors to movements toward the window block 32*a***. Such a technique enables the exertion of enough magnetic ramming force on even the conductors immediately adjacent to the window block that such active side conductors may be made to lie along lines which are concave relative to the coil window and longer than geodesic lines, if desired. It will be appreciated that the magnetic ramming force will be exerted in the same direction if both the field polarity and the direction of the pulsating current flow are opposite to those shown and described.

The current with which the coil is pulsed while it is still in the winding arbor not only produces the magnetic ramming force as described but also causes the coil to heat so that the thermoplastic insulating coating of the wire softens and the coatings of adjacent conductors merge with one another during the ramming operation and become bonded together when the current is removed and the coil is cooled as by blowing cold air into the arbor cavity. The coil, when removed from the arbor after separation of the male and female members 21 and 22, thus is quite rigid and is ready for assembly into a deflection yoke.

Figures 6, 7, 8:
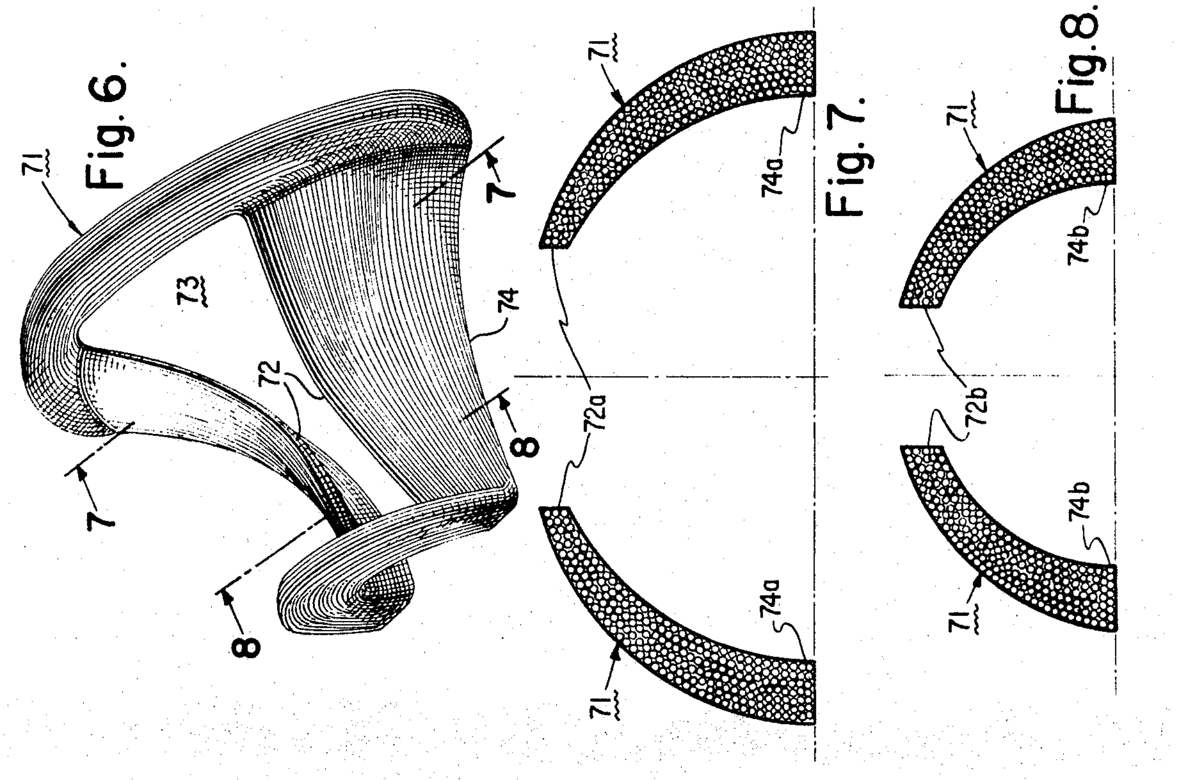
FIG. 6 is a view of a deflection yoke coil produced by the magnetic ramming technique of the present invention.
FIG. 7 is a cross sectional view taken on the line 7—7 of FIG. 6 and showing the substantially uniform fill of the cavity cross section by the side conductors in a forward portion of the magnetically rammed coil.
FIG. 8 is a cross sectional view taken on the line 8—8 of FIG. 6 and showing the substantially uniform fill of the cavity cross section by the side conductors in a rearward portion of the magnetically rammed coil.
Figures 3, 4, 5:
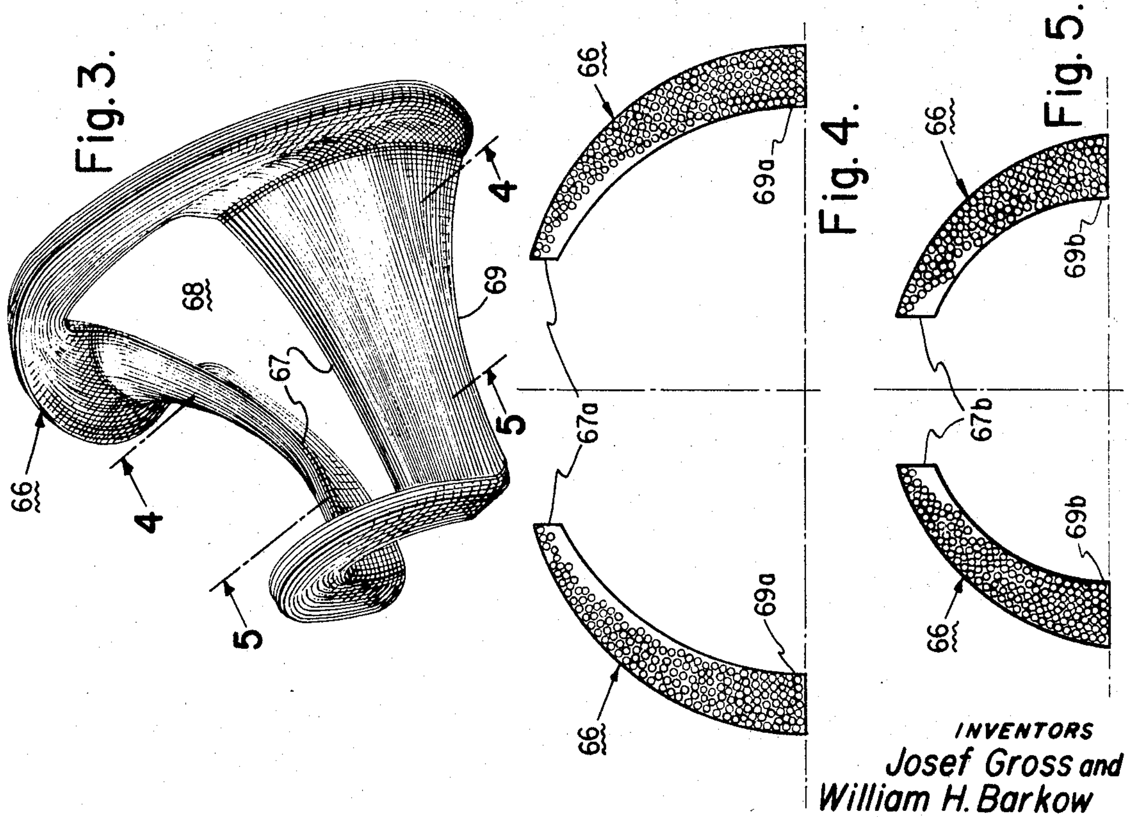
FIG. 3 is a view of a representative coil produced by the heretofore used mechanical ramming technique.
FIG. 4 is a cross sectional view taken on the line 4—4 of FIG. 3 and showing the nonuniformity of the fill of the cavity cross section by the side conductors in a forward portion of the mechanically rammed coil.
FIG. 5 is a cross sectional view taken on the line 5—5 of FIG. 3 and showing the nonuniformity of the fill of the cavity cross section by the side conductors in a rearward portion of the mechanically rammed coil.

A comparison of FIGS. 3, 4 and 5 (relating to a conventionally formed coil) with FIGS. 6, 7 and 8 (relating to a coil formed by the technique of the present invention) illustrates some of the benefits produced by this invention. The conventionally formed coil 66 of FIGS. 3, 4 and 5 may be made, by apparatus such as that disclosed in the Haslau patent, to have conductors 67 adjacent the window opening 68 and conductors 69 remote from the window opening which follow substantially geodesic lines. The conductors may be wound convex longer than geodesic, but not concave longer than geodesic as present winding apparatus cannot wind a coil around a window block concave longer than geodesic. However, because the mechanical ramming force in the Haslau apparatus is applied directly only to the conductors 69 remote from the window opening 68 and only indirectly, if at all, to other coil conductors including the conductors 67 adjacent to the window opening, it is not possible in a commercially practical sense to achieve the optimum distribution of the longitudinal active side conductors in the arbor cavity (i.e., a distribution in which the side conductors are concave longer than geodesic toward the window block). A further deficiency of present coil forming techniques is illustrated in FIGS. 4 and 5, in which it can be seen that the side conductors **67*a* and 67*b* adjacent to the window opening 68 in both forward and rearward portions of the coil 66** do not completely fill the cavity cross section, and as previously described, mechanical ramming techniques are ineffective to accomplish the desired filling of the cavity cross section.

In the coil 71 of FIGS. 6, 7 and 8, formed by the magnetic ramming technique in accordance with the present invention, the conductors 72 adjacent the window opening 73 follow lines which are concave longer than geodesic, i.e., bow into the window. The conductors 74 remote from the window opening follow lines such that these conductors will abut corresponding conductors of another coil when fitted together in the yoke. Because of the described substantially uniform ramming forces exerted on all conductors of the coil by the use of the technique of the invention, the longitudinal active side conductors may be made to completely fill the arbor cavity cross section and to be distributed therein in the desired manner. FIGS. 7 and 8 illustrate that, in both forward and rearward portions of the coil 71, not only do the conductors **74*a* and 74*b* remote from the window opening 73 completely fill the cavity cross section, but also the cavity cross section is substantially completely filled by the conductors 72*a* and 72*b*** adjacent the window opening.

Figure 10:
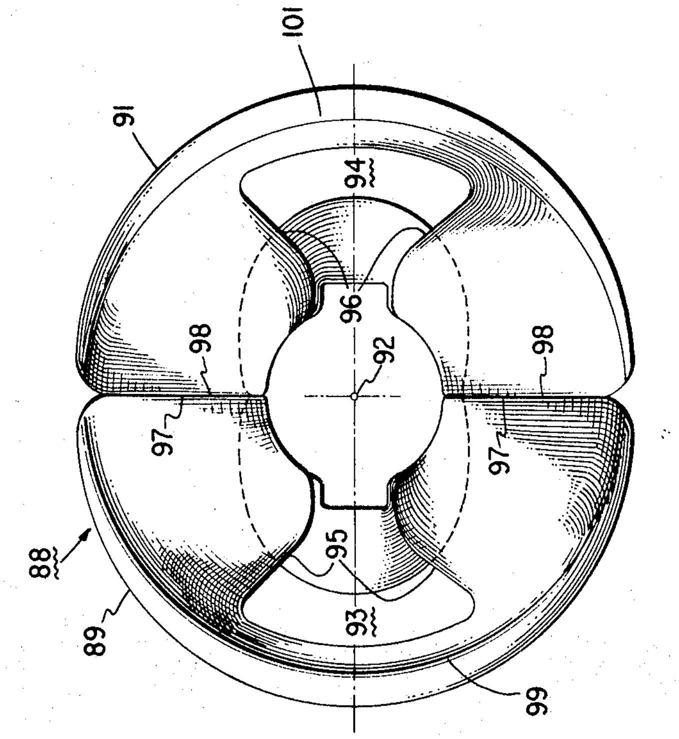
FIG. 10 is a front view of a deflection yoke showing the two diametrically opposed coils of one of the two windings, the coils having been formed by the magnetic ramming technique in accordance with this invention.
Figure 9:
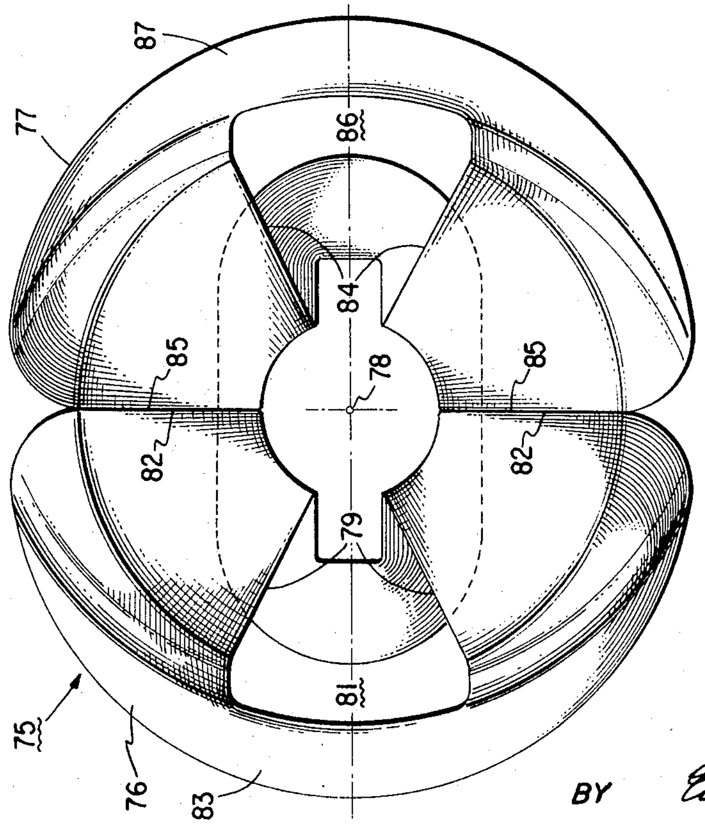
FIG. 9 is a front view of a deflection yoke showing the two diametrically opposed coils of one of the windings, the coils having been formed by the prior art mechanical ramming technique.

Structural differences between a deflection yoke comprising coils made by a conventional mechanical ramming technique and a yoke comprising coils made by the technique of magnetic ramming in accordance with this invention may also be seen by a comparison of FIGS. 9 and 10. The yoke 75 of FIG. 9, which is a front end view, includes two coils 76 and 77 mounted on diametrically opposite sides of the longitudinal axis 78 of the yoke and the cathode ray tube with which it is used. The coils 76 and 77 are formed by the mechanical ramming technique as disclosed in the Haslau patent, for example. The coil 76 has longitudinal active side conductors 79 adjacent to a window opening 81 and other longitudinal active side conductors ranging to those conductors 82 remote from the window opening. The side conductors on opposite sides of the window opening 81 are connected by end conductors extending transeversely of the yoke and the cathode ray tube with which it is used at both front and rear ends of the yoke, but only the front end transverse conductors 83 are visible in FIG. 9. The coil 77 also has side conductors 84 and 85 respectively adjacent to and remote from a window opening 86, with the front ends of the side conductors being connected by transverse conductors 87, the rear ends of the side conductors also being connected by similar transverse conductors which are not visible in this front end view of the yoke 75. While all of the side conductors of the two coils 76 and 77 of the yoke 75 may follow substantially geodesic lines along the neck and flared bulb portions of a cathode ray tube, it is to be noted that the side conductors do not follow lines which are concave longer than geodesic toward the winding, therefore, a minimum $H_2$ field yoke does not result from this design.

FIG. 10 is a front end view of a deflection yoke 88 which includes two coils 89 and 91, formed by the magnetic ramming technique of the invention, which are mounted on diametrically opposite sides of the longitudinal axis 92 of the yoke and the cathode ray tube with which it is used. The two coils 89 and 91 have respective window openings 93 and 94, the sides of which are defined and bounded by the longitudinal active side conductors 95 and 96 adjacent to the respective window opening. The side conductors 95 and 96 adjacent to the window openings 93 and 94, respectively, follow lines concave longer than geodesic toward the windows 93 and 94. The side conductors 97 and 98 most remote from the windows 93 and 94 are wound such that they abut one another when the coils are assembled in the yoke. The side conductors including the conductors 95 and 97 of the coil 89 are connected at the front end of the yoke by transverse conductors 99 and at the rear by similar transverse conductors (not visible). Transverse conductors 101 connect the front ends of the side conductors including conductors 96 and 98 of the coil 91, the rear ends of these conductors being similarly connected.

It is to be understood that the magnetic ramming technique may advantageously be utilized to form coils having the side conductors thereof follow any path between the front and rear end conductors, and maximum cavity cross section fill will be realized, but the magnetic ramming technique also enables the realization of optimum coil design, such as a coil having its side conductors concave longer than geodesic as described above, which design could not be made utilizing prior art techniques.

Among the many benefits to be derived from the use of the magnetic ramming technique of the present invention is the ability to provide a side conductor configuration and distribution by which to produce an optimum deflection yoke. Such a yoke should generate a deflection field, through which the electron beam or beams must pass, that has a minimum transverse nonuniformity. In FIG. 11 the broken line curve represents the transverse nonuniformity ($H_2$) of the deflection field produced by a typical yoke having coils formed by apparatus employing mechanical ramming as disclosed in the Haslau patent, for example. Such a curve has a positive lobe 102 in the main deflection region between the front and rear ends of the yoke. The field nonuniformity represented by the positive lobe 102 tends to produce "barrel" distortion of the raster scanned by an electron beam subjected to such a field. The curve also has negatitve lobes 103 and 104, respectively, in the rear entrance and front exit fringe regions. These negative lobes represent field nonuniformities which tend to produce "pincushion" distortion of the raster scanned by an electron beam subjected to such a field.

The optimum deflection yoke should have a minimum transverse field nonuniformity ($H_2$) in order to be able to deflect an electron beam or beams with minimum astigmatism, no coma and a minimum, if any, raster distortion such as "pincushion" for example. Pincushion distortion of the scanned raster may be minimized by concentrating a large proportion of the active side conductors in the part of the coil remote from the window at the front of the yoke. Coma may be eliminated by concentrating a large proportion of the active side conductors in the part of the coil remote from the window at the rear of the yoke. Astigmatism, on the other hand, may be minimized by concentrating a large proportion of the active side conductors in that part of the coil adjacent to the window opening in a region between the front and rear ends of the yoke. In order to satisfy these three requirements of side conductor distribution a typical active side conductor must have a configuration which is longer than a geodesic line and is concave toward the window opening. As has been described, the magnetic ramming technique of this invention enables the achievement of such a side conductor configuration. The concentration of active side conductors remote from the window opening at the rear and front ends of a yoke coil results in the raising of the negative fringe region lobes of the transverse field nonuniformity function as represented by the solid line curve portions 105 and 106 of FIG. 11. The concentration of active side conductors adjacent the window opening in ends results in the lowering of the positive main lobe of ends results in the lowering of hte positive main lobe of the transverse field nonuniformity function as represented by the solid line curve portion 107 of FIG. 11.

FIG. 12 is a circuit diagram of one arrangement that has been used successfully to produce pulsing current for the magnetic coil ramming operation. The pulsing current for magnetically forming the deflection coil 108 is produced by discharging a storage capacitor 109 through a discharge tube 111 such as an ignitron of type GL–5554/FG–259, for example. Energy from alternating current terminals 112 is applied to a cathode heater transformer 113 associated with a rectifier tube 114 upon closure of a single pole switch 115. At the same time a delay relay 116 is energized, but its contacts 117 and 118 do not close until the cathode 119 of the rectifier tube 114 has had time to be sufficiently heated for the tube 114 to function. When the contacts 117 and 118 of the relay 116 have closed, a double pole switch 121 is manually operated to supply alternating current energy through a variable voltage autotransformer 122 and a fixed voltage ratio transformer 123 to the anode 124 of the rectifier tube 114. Closure of the double pole switch 121 also energizes a discharge relay 125 to disengage its contacts 126 which opens a discharge circuit including a resistor 127 across the storage capacitor 109, thereby enabling the capacitor to be charged by the rectifier tube 114 through the parallel connected resistors 128 and 129.

While the storage capacitor 109 is being charged in the manner described, the discharge tube 111 is prepared for firing by the closure of a double pole switch 131 which connects the alternating current terminals 112 through a variable voltage autotransformer 132 and a fixed voltage ratio transformer 133 to a full wave rectifier including diodes 134 and 135. This rectifier, which also includes a filter comprising a series choke coil 136 and a shunt capacitor 137, serves to charge a trigger storage capacitor 138 through a series charging resistor 139 and an isolating diode 141. Assuming that the storage capacitor 109 and the trigger storage capacitor 138 are charged to full capacity, a momentary manual closure of a pulsing switch 142 energizes a relay 143 to close its contacts 144, thereby effecting the discharge of the trigger storage capacitor 138 through a series discharging resistor 145 to the trigger electrode 146 of the discharge tube 111. Such energization of the trigger electrode of the tube 111 establishes a current conducting path between the electrodes 147 and 148 of the tube 111 through which the storage capacitor 109 is discharged through the deflection coil 108, thereby supplying the pulsing current for effecting the described magnetic ramming and bonding of the coil.

Magnetic ramming of a deflection yoke coil having an inductance of 0.27 millihenry and a resistance of 0.36 ohm has been successfully accomplished at both relatively high and low voltages. In a high voltage form of the circuit of FIG. 12 the storage capacitor 109 had a value of 400 microfarads and comprised the parallel connection of four (4) 100 microfarad units, each having a voltage rating of 5 kilovolts. The capacitor was charged to impress a voltage of 1500 volts upon the electrode 147 of the discharge tube 111 by suitably adjusting the autotransformer 122. The operation of the pulsing switch 142 caused the coil 108 to be traversed by a current pulse having a duration of approximately one (1) millisecond and a peak amplitude of approximately 1060 amperes. With a magnetic field of approximately 10.8 kilograuss established between the male and female cavity forming members of the winding arbor as described with reference to FIG. 2, such a ramming current pulse produced a total peak force of approximately 1545 pounds on both legs of the coil including the respective side conductors 59–61 and **59*a*–61*a*** shown in FIG. 2. The conductors of the coil were thus constrained to follow paths that were longer than geodesic lines and concave toward the window opening of the coil.

In a relatively low voltage form of the circuit of FIG. 12 the storage capacitor 109 consisted of six (6) 2500 microfarad 350 volt units connected in parallel to have a total value of 15,000 microfarads. By proper adjustment of the autotransformer 122 the storage capacitor 109 was charged to impress a voltage of about 300 volts upon the electrode 147 of the discharge tube 111 which resulted in the production of a ramming current pulse of approximately 460 amperes at peak amplitude and a time duration of about 30 milliseconds. The coil was subjected to a total peak force of approximately 655 pounds which was sufficient to give the side conductors the desired configurations.

In both of the high and low voltage forms of the circuit of FIG. 12 the thermoplastic insulating coating of the coil conductors was heated sufficiently to produce the desired bonding of the coil. While the use of the low voltage form of the circuit materially reduces the voltage breakdown hazard during the ramming operation it does require the storage in the capacitor 109 of a considerably larger amount of energy than is required in the high voltage form. As a safety precaution in either circuit form, therefore, the opening of the double pole switch 121 and the resulting deenergization of the relay 125, thereby closing its contacts 126, insures the complete discharge of the capacitor 109 through the resistor 127. Also, the inclusion of the diode 141 in the power supply circuit for the trigger electrode 146 of the discharge tube 111 prevents the discharge of the capacitor through any part of its charging circuit.

It may be seen from the foregoing disclosure of the invention that the magnetic ramming of deflection yoke coils has many advantages over the previously used mechanical ramming technique, resulting in the production of coils not heretofore possible to produce. Whereas mechanical ramming can affect directly only about that one-third of the coil convolutions which are most remote from the window opening, magnetic ramming is equally effective on all coil convolutions. Because of the fact that the mechanical ramming force is applied in a direction parallel to the plane of symmetry of the coil and because of the large amount of friction between the coil convolutions, only a small fraction of the applied mechanical force is converted into a force on the convolutions which is tangential to the mated surfaces of the male and female cavity forming members and which is needed to move the active side conductors toward the window block of the winding arbor. Active side conductors adjacent to the window, therefore, are practically unaffected by mechanical ramming and thus, at best, can provide geodesic line configurations. The magnetic ramming technique, on the other hand, exerts substantially equal tangential force on all of the active side conductors of the coil, thereby enabling the formation of even those conductors adjacent to the window into configurations which are longer than geodesic lines and concave toward the window. Drastic mechanical ramming frequently causes abrasion of the wire insulation and deformation of the wire cross section which further strains the insulation and sometimes nicks the insulation on those convolutions remote from the window opening which are in direct contact with the mechanical rammer. Any of these deficiencies of the mechanical ramming technique results in a greater than desired number of coil rejections. Magnetic ramming produces none of these deficiencies and, therefore, results in a material reduction in the number of rejections.

Other advantages of the magnetic ramming technique over that of the previously used mechanical ramming are that it reduces wear on the cavity forming male and female winding arbor members and it renders less critical the roles played by the wire deflecting rods 39–41 and vanes 49–51 of FIG. 1 and other wire feeding and guiding devices (not shown) in producing a "dynamically windable" deflection yoke coil. As a practical matter, a coil is considered dynamically windable if, after high speed (approximately 400 r.p.m., for example) winding and ramming, the convolutions of the coil substantially completely and uniformly fill the arbor cavity without having developed shortcircuited convolutions, weakened insulation or other defects which would necessitate rejection. In the use of coil winding apparatus of the type shown in the Haslau patent the tension on the wire being wound into the arbor cavity fluctuates from a relatively high value while it is being drawn to form the active side conductors of the coil following the curved sides 37 and 38 of the window block 32 of FIG. 1 to a relatively low value as it is deflected from the vanes 49 and 51 to form the transverse end conductors of the coil. This reduction in tension causes the wire to spring back away from the window block so that, at best, mechanical ramming can produce a coil in which the active side conductors have geodesic line configurations. Practically, however, in such coils many of the side conductors, particularly those remote from the window opening, have configurations which are longer than geodesic lines but are convex relative to the window opening.

In the formation of an optimum deflection yoke coil made possible by the use of the magnetic ramming technique it is desirable that active side conductor portions of the coil convolutions be wound into the wire cavity with enough slack to enable them to be magnetically rammed into configurations which are not only longer than geodesic lines but also are concave relative to the window. In order to allow for the proper amount of slack, the tension on the wire is reduced and, hence, wear on the winding arbor members produced by wire friction is reduced. Also, because of the need for a certain amount of slack in the wire wound into the cavity, the design of such wire guiding devices as the deflecting rods 39–41 and vanes 49–51 of FIG. 1 is rendered less critical.

Having disclosed an illustrative embodiment of the invention with a description of its mode of operation and demonstrated its advance over the prior art, its scope is defined in the following claims.

What is claimed is:

1. Apparatus for forming a saddle type coil of an electron beam deflection yoke for a cathode ray tube, comprising:

a pair of male and female members mounted on respective mounting plates and mated in spaced relation to one another so as to form a cavity therebetween in which to receive a plurality of convolutions of wire constituting said coil;

a window block extending between said male and female members to divide said cavity into two compartments which are equal and symmetrical relative to said window block and in which to receive the longitudinal active side conductors of said coil;

means including said male and female members for producing a magnetic field in both compartments of said cavity which is substantially normal to the opposing surfaces of said mated cavity-forming male and female members; and means for pulsing said coil received within said cavity with current to produce an electromagnetic ramming force on all of said longitudinal side conductors of said coil;

said electromagnetic ramming force being oriented substantially tangentially to said opposing surfaces of said mated male and female members, and the direction of flow of said current in said side conductors in relation to the polarity of said magnetic field being such as to constrain all of said side conductors to move inwardly toward said window block and thus completely fill both compartments of said cavity with said coil convolutions.

2. Apparatus for forming a saddle type deflection yoke coil as defined in claim 1, wherein: said male and female members are permanent magnets of opposite polarity, thereby producing said magnetic field in said cavity.

3. Apparatus for forming a saddle type deflection yoke coil as defined in claim 1, wherein:

said male and female members are of magnetically permeable material; and said magnetic field producing means includes a two pole magnetizer having one of its poles adjacent said male member and the other of its poles adjacent said female member.

4. Apparatus for forming a saddle type deflection yoke coil as defined in claim 1, wherein:

said wire forming the convolutions of said coil has a thermoplastic insulating coating;

said pulsing current causes the production of sufficient heat to soften said coating; and said electromagnetic ramming force is such as to cause the softened coatings of adjacent convolutions of said coil to merge with one another and become bonded together after cessation of said pulsing current and cooling of said coil.

5. Apparatus as defined in claim 1 for forming a saddle type coil of a deflection yoke for a cathode ray tube having a substantially cylindrical neck section housing an electron gun and merging into a flared bulb section housing a luminescent screen, wherein:

said female member has a pair of spaced recesses of concave configuration relative to its mounting plate conforming to the desired outer surface formed by said longitudinal active side conductors of said coil, said recesses being separated by and symmetrical relative to said window block protruding inwardly from the center of said female member;

said male member has a pair of spaced body sections of convex configuration relative to its mounting plate conforming to the desired inner surface formed by said longitudinal active side conductors of said coil, said body sections being separated by and symmetrical relative to central opening to receive said window block; and said recesses and said corresponding body sections forming said two compartments.

6. Apparatus for forming a saddle type deflection yoke coil as defined in claim 5, wherein: the concave configurations of the recesses of said female member and the convex configurations of the body sections of said male member conform substantially to the merged cylindrical neck and flared bulb sections of said cathode ray tube.

7. Apparatus for forming a saddle type deflection yoke coil as defined in claim 6, wherein: said male and female members are permanent magnets of opposite polarity, thereby producing said magnetic field in said cavity.

8. Apparatus for forming a saddle type deflection yoke coil as defined in claim 6, wherein:

said male and female members are of magnetizable material; and said magnetic field producing means includes a two pole magnetizer having one of its poles adjacent said male member and the other of its poles adjacent said female member.

9. Apparatus for forming a saddle type deflection yoke coil as defined in claim 5, wherein:

said wire forming the convolutions of said coil has a thermoplastic insulating coating;

said pulsing current causes the production of sufficient heat to soften said coating; and said electromagnetic ramming force is such as to cause the softened coatings of adjacent convolutions of said coil to merge with one another and become bonded together after cessation of said pulsing current and cooling of said coil.

10. A saddle type coil of an electron beam deflection yoke for a cathode ray tube having a substantially cylindrical neck section housing an electron gun and merging into a flared bulb section housing a luminescent screen, comprising:

a plurality of convolutions of wire, each convolution including an active conductor portion disposed on opposite longitudinal sides of a window opening of said coil and extending generally longitudinally of said tube and conforming to the cylindrical neck and flared bulb sections of said tube, and front and rear end conductor portions extending generally transversely of said tube and connecting said active conductor portions;

the longitudinal active conductor portions of those wire convolutions immediately adjacent to said window opening being concave longer than geodesic toward the center of said window opening.

11. An electron beam deflection yoke for a cathode ray tube, said tube having a substantially cylindrical neck section housing an electron gun for producing said electron beam and merging into a flared bulb section housing a luminescent screen to be scanned by said electron beam, comprising:

two pairs of coils mounted about the central longitudinal axis of said yoke and said tube, the coils of each pair being diametrically opposed to one another and the two pairs of coils being disposed at a 90 degree angle relative to one another circumferentially of said yoke and said tube;

each coil of at least one of said two pairs of coils including, a plurality of convolutions of wire, each convolution having an active conductor portion disposed on opposite longitudinal sides of a window opening of said coil and extending generally longitudinally of said tube conforming to the cylindrical neck and flared bulb sections of said tube, and front and rear end conductor portions extending generally transversely of said tube and connecting said active conductor portions;

the longitudinal active conductor portions of those wire convolutions immediately adjacent to said window opening being concave longer than geodesic toward the respective centers of said window openings.

12. In an electron beam deflection yoke as described in claim 11, wherein: the longitudinal active conductor portions of each of said coils remote from said respective longitudinal window opening sides follow geodesic lines along the neck and flared bulb sections of said tube.

References Cited

UNITED STATES PATENTS

| | | | |
|---|---|---|---|
| 3,226,588 | 12/1965 | Barkow et al. | 335—213 XR |
| 3,333,330 | 8/1967 | Linkous. | |
| 3,407,488 | 10/1968 | Larsen | 29—605 XR |
| 3,471,926 | 10/1969 | Sims | 29—605 |

GEORGE HARRIS, Primary Examiner

U.S. Cl. X.R.

313—75; 72—56; 29—605

UNITED STATES PATENT OFFICE

CERTIFICATE OF CORRECTION

Patent No. 3,518,590 Dated June 30, 1970

Inventor(s) Josef Gross et al

It is certified that error appears in the above-identified patent and that said Letters Patent are hereby corrected as shown below:

Column 6, line 22, that portion reading "50-59a" should read -- 59-59a -- .
Column 6, line 25, after "conductors" and before "59a" insert -- 59 and 61 and out of the plane of the drawing in conductors -- .
Column 8, line 69, that first portion reading "ends results in the lowering of the positive main lobe of" should read -- the central region of the coil between the front and rear --.
Column 9, line 59, that portion reading "kilograuss" should read -- kilogauss -- .

SIGNED AND SEALED
NOV 10 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P69
U.S. GOVERNMENT PRINTING OFFICE 1969 O-366-334